United States Patent
Staal et al.

(10) Patent No.: US 12,420,954 B2
(45) Date of Patent: Sep. 23, 2025

(54) COMPOSITE REPAIR COMPONENTS WITH CUSTOMIZABLE SHIMS

(71) Applicant: THE BOEING COMPANY, Arlington, VA (US)

(72) Inventors: Remmelt A. Staal, Irvine, CA (US); Arne K. Lewis, Auburn, WA (US); Justin H. Register, Charleston, SC (US)

(73) Assignee: The Boeing Company, Arlington, VA (US)

( * ) Notice: Subject to any disclaimer, the term of this patent is extended or adjusted under 35 U.S.C. 154(b) by 158 days.

(21) Appl. No.: 18/299,421

(22) Filed: Apr. 12, 2023

(65) Prior Publication Data
US 2024/0343414 A1    Oct. 17, 2024

(51) Int. Cl.
  *B64F 5/40* (2017.01)
  *B29C 73/10* (2006.01)
  *B29C 73/30* (2006.01)

(52) U.S. Cl.
  CPC ............... *B64F 5/40* (2017.01); *B29C 73/10* (2013.01); *B29C 73/30* (2013.01)

(58) Field of Classification Search
  CPC ........................................................... B64F 5/40
  See application file for complete search history.

(56) References Cited

U.S. PATENT DOCUMENTS

| | | | | |
|---|---|---|---|---|
| 4,916,880 A * | 4/1990 | Westerman, Jr. | ....... | B29C 73/04 29/402.09 |
| 5,868,886 A * | 2/1999 | Alston | ....... | B64F 5/40 156/92 |
| 8,584,986 B2 * | 11/2013 | Pina | ....... | B64F 5/40 244/119 |
| 9,382,018 B2 * | 7/2016 | Roux | ....... | B29C 73/04 |
| 10,308,342 B2 * | 6/2019 | Staal | ....... | B64C 1/069 |
| 12,077,289 B2 * | 9/2024 | Spreadbury | ....... | B64C 3/185 |
| 2012/0104166 A1 * | 5/2012 | Pina | ....... | B64F 5/40 244/119 |
| 2012/0152438 A1 * | 6/2012 | Benthien | ....... | B29C 73/32 156/83 |
| 2019/0210308 A1 * | 7/2019 | Marouzé | ....... | B64C 1/064 |
| 2024/0342842 A1 * | 10/2024 | Ridgeway | ....... | B29C 73/04 |
| 2024/0343414 A1 * | 10/2024 | Staal | ....... | B29C 73/10 |

FOREIGN PATENT DOCUMENTS

EP    3498462 B1 *   9/2023   ............. B29C 73/04

OTHER PUBLICATIONS

Extended European Search Report, dated Sep. 24, 2024, regarding EP Application No. 24168421.6, 9 pages.

* cited by examiner

*Primary Examiner* — Jacob J Cigna
(74) *Attorney, Agent, or Firm* — Yee & Associates, P.C.

(57) ABSTRACT

The present disclosure provides repair systems, repair components, and methods for repairing composite structure systems using a set number of prefabricated repair components including a repair component and various shims which are fabricated to repair multiple composite members in a composite structure system.

17 Claims, 9 Drawing Sheets

COMPOSITE REPAIR COMPONENTS WITH CUSTOMIZABLE SHIMS

FIELD

Aspects of the present disclosure relate to repair components for composite structures. More specifically, this disclosure relates to a system of prefabricated repair components, including shims, that provide for quick and efficient repairs to damaged portions of composite structures.

BACKGROUND

Fiber-reinforced plastics, such as epoxy-based carbon fiber-reinforced plastic (CFRP) composites, have high strength-to-weight ratios and increased durability. These advantages have led to the wide use of composite structures formed from CFRPs in the aerospace industry (e.g., as structural/frame components of aircraft), as well in various other industries.

While fiber-reinforced plastics have many advantages, the repair of composite structures formed from fiber-reinforced plastics can be time-consuming and, therefore, expensive. For example, once a CFRP material is cured in a certain size or shape, the part is geometrically locked to that size and shape. Challenges arise when a part formed with CFRP material is damaged and requires repair, particularly when the part has a curved or complex geometry. This often leads to the need for custom repair parts that are fabricated for a specific damaged component.

Existing processes for repairing a damaged CFRP or composite part include creating a tooling surface and fabricating an overlay part to match the part geometry. These processes can be time consuming and result in added delay to getting the composite structure back into useful service. Providing prefabricated repair components which are usable across many different structures/members in a composite structure system remains a challenge.

SUMMARY

One general aspect includes a repair component for a composite member. The repair component may include: a first flange section, a second flange section, and a repair section between the first flange section and the second flange section. The repair section is positioned over at least a damaged section of the composite member. The repair component also includes at least one shim component positioned on a first side of the at least one of the first flange section, the second flange section, and the repair section to fill an air gap on the first side.

Implementations may include one or more of the following features. The repair component where a repair surface of the repair section faces an external surface of the composite member, and where the air gap is between the repair surface and the external surface.

In one aspect, in combination with any example repair component above or below, an external cross-sectional profile defined on the external surface of the composite member may include a hat-stiffened structural profile.

In one aspect, in combination with any example repair component above or below, the repair component may include a first surface on the first flange section, the second flange section, and the repair section. The first flange section may include a second surface opposite the first surface. The second flange section may include a third surface opposite the first surface. The repair component may further include a plurality of bolt holes, where each bolt hole of the plurality of bolt holes is formed through the repair component from the first surface to one of the repair surface, the first surface, and the second surface, and through the at least one shim. The repair component is attached to the composite member via a plurality of fastened bolts, where each fastened bolt of the plurality of fastened bolts is positioned in a respective bolt hole of the plurality of bolt holes.

In one aspect, in combination with any example repair component above or below, the composite member may include a stringer component in an aircraft.

In one aspect, in combination with any example repair component above or below, the repair component may include a composite material.

In one aspect, in combination with any example repair component above or below, the repair component may include a fabrication length, where the repair component is cut down to a selectable length shorter than the fabrication length, prior to attachment to the composite member.

One general aspect includes a repair system for a composite structure system. The repair system may include: a total set of repair components may include a plurality of repair component subsets. Each repair component in a respective repair component subset may include features for repairing a subset of composite members in the composite structure system and a set of prefabricated shims configured to fill an air gap between a damaged composite member and a selected repair component from the total set of repair components.

Implementations may include one or more of the following features. The repair system where each repair component subset of the plurality of repair component subsets may include: at least one repair components that includes sizing dimensions suitable to repair the subset of composite members. In one aspect, each repair component of a repair component subset may include: a first flange section, a second flange section, and a repair section between the first flange section and the second flange section. The repair component may include an internal cross-sectional profile defined on a repair surface of repair section, where the repair section is positioned over at least a damaged section of a composite member of the subset of composite members, where the repair surface faces an external surface of the composite member, where the air gap is between the repair surface and the external surface, where the composite member may include an external cross-sectional profile defined on the external surface, and where the internal cross-sectional profile matches the external cross-sectional profile within a given tolerance.

In one aspect, in combination with any example repair system above or below, the external cross-sectional profile may include a hat-stiffened structural profile.

In one aspect, in combination with any example repair system above or below, each repair component may include a first surface on the first flange section, the second flange section, and the repair section, where the first flange section may include a second surface opposite the first surface, where the second flange section may include a third surface opposite the first surface, and where the selected repair component further may include a plurality of bolt holes, where each bolt hole of the plurality of bolt holes is formed through the selected repair component from the first surface to one of the repair surface, the first surface, and the second surface, and where the selected repair component is attached to the damaged composite member via a plurality of fastened bolts. Each fastened bolt of the plurality of fastened bolts is positioned in a respective bolt hole of the plurality of bolt holes.

In one aspect, in combination with any example repair system above or below, the composite structure system may include an aircraft, where the subset of composite structures may include a plurality of stringer components in the aircraft, and where the damaged composite member may include a stringer in the aircraft.

In one aspect, in combination with any example repair system above or below, each repair component and each of the at least one shim may include a composite material.

In one aspect, each repair component may include a fabrication length, where a respective repair component is cut down to a selectable length shorter than the fabrication length, prior to attachment to the damaged composite member.

One general aspect includes a method for repairing a composite member. The method may include: determining an air gap between a positioned repair component and a composite member, selecting at least one shim component from a repair component system to fill the air gap, positioning the at least one shim to fill the air gap, and attaching the positioned repair component and the at least one shim to the composite member.

Implementations may include one or more of the following features. The method including selecting a repair component for a damaged section of the composite member from the repair component system based on an external cross-sectional profile of the composite member, and positioning the repair component over the damaged section such that a first flange section of the repair component is positioned on a first side of the composite member, a second flange section of the repair component is positioned over a second side of the composite member, and a repair section of the repair component, between the first flange section and the section flange section, is positioned over at least the damaged section of the composite member.

In one aspect, in combination with any example method above or below, the repair section may include an internal cross-sectional profile defined on a repair surface of a repair section, where the repair surface faces an external surface of the composite member, where the composite member may include an external hat-stiffened structural profile defined on the external surface, and where the internal cross-sectional profile matches the external hat-stiffened structural profile within a given tolerance.

In one aspect, the repair component may include a first surface on the first flange section, the second flange section, and the repair section, where the first flange section may include a second surface opposite the first surface, where the second flange section may include a third surface opposite the first surface, and where the repair component may further include a plurality of bolt holes, where each bolt hole of the plurality of bolt holes is formed through the repair component from the first surface to one of the repair surface, the second surface, and the third surface. Attaching the positioned repair component to the composite member may include: positioning a plurality of bolts through the plurality of bolt holes such that the bolts pass through the repair component and the composite member, and fastening the plurality of bolts to secure the repair component to the composite member.

In one aspect, in combination with any example method above or below, the method may include: determining a selectable length for the repair section based on a lateral length of the damaged section of the composite member, and cutting the repair component from a fabrication length to the selectable length.

In one aspect, in combination with any example method above or below, the composite member may include a stringer component in an aircraft.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

As described above, carbon fiber-reinforced plastic (CFRP) composites (herein composite(s)) are an increasingly important material used in a wide variety of industries including aerospace, automobile, marine, and other applications. These composite materials provide many advantages due to their light weight and relatively high strength and durability. However, repairing damaged composite structures can be difficult and expensive.

In some examples, repairing a damaged metallic member is often achieved using a preformed generic or near-generic metallic repair piece and then altering the metallic repair piece to fit the damaged section of the metallic member (e.g., through hammering, welding, or other metal-working processes). In contrast, composite materials have low malleability once cured and generally cannot be altered during a repair process. Thus, repairing a damaged composite structure typically requires a custom composite repair component to be fabricated that will fit the damaged section of the composite structure.

Additionally, composite structure systems often have a large variety of composite members with varying shapes, thicknesses, etc. For example, an aircraft utilizing composite structures may include many composite members where each composite member also has a varying structure at different points on the composite member (e.g., a curved member, etc.). This results in thousands of locations with unique geometries or shapes on the individual composite members in a composite system. Providing prefabricated repair components for each of the thousands of unique locations presents an inventory and logistical challenge for operators and manufacturers. For example, an aircraft manufacturer or an airline operator would need to fabricate and store an inventory of thousands of unique repair components in order to provide quick repairs to the composite members.

The repair systems, repair components, and methods described herein provide for repairing composite structure systems using a set number of prefabricated repair components including a repair component and various shims which are fabricated to repair multiple composite members in a composite structure system.

Figure 1:
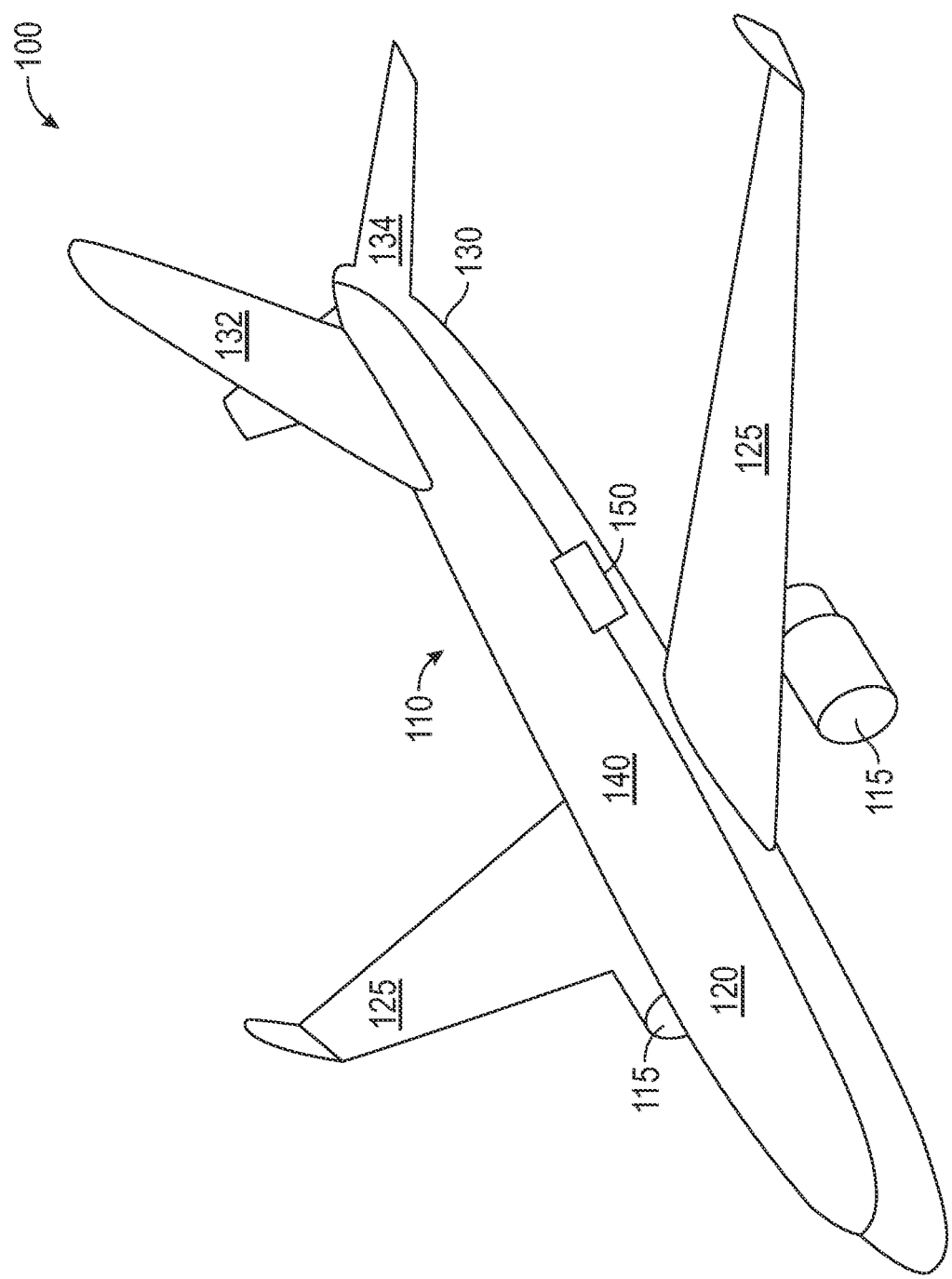
FIG. 1 depicts an example composite structure system, according to one embodiment.

FIG. 1 depicts an example composite structure system, according to one embodiment. In FIG. 1, the composite structure system is an aircraft 100; however, the various composite structure systems described herein may include any type of composite structure system, including any vehicular (e.g., automotive, space, and marine vehicles, etc.) or non-vehicular application. The repair components and repair component system described herein may also be utilized in any of these applications.

The aircraft 100 includes an airframe 110 and a propulsion system 115. The airframe 110 includes a pair of wings 125 extending outwardly from a fuselage 120. The airframe 110 also includes a tail section 130 having a horizontal stabilizer 132, a vertical stabilizer 132, and/or other control surfaces normally associated with an aircraft. Each part of the airframe 110 may include skin members 140 which may be internally supported by structural components as shown in in more detail in the depiction of section 150 of the airframe 110 in FIG. 2.

Figure 2:
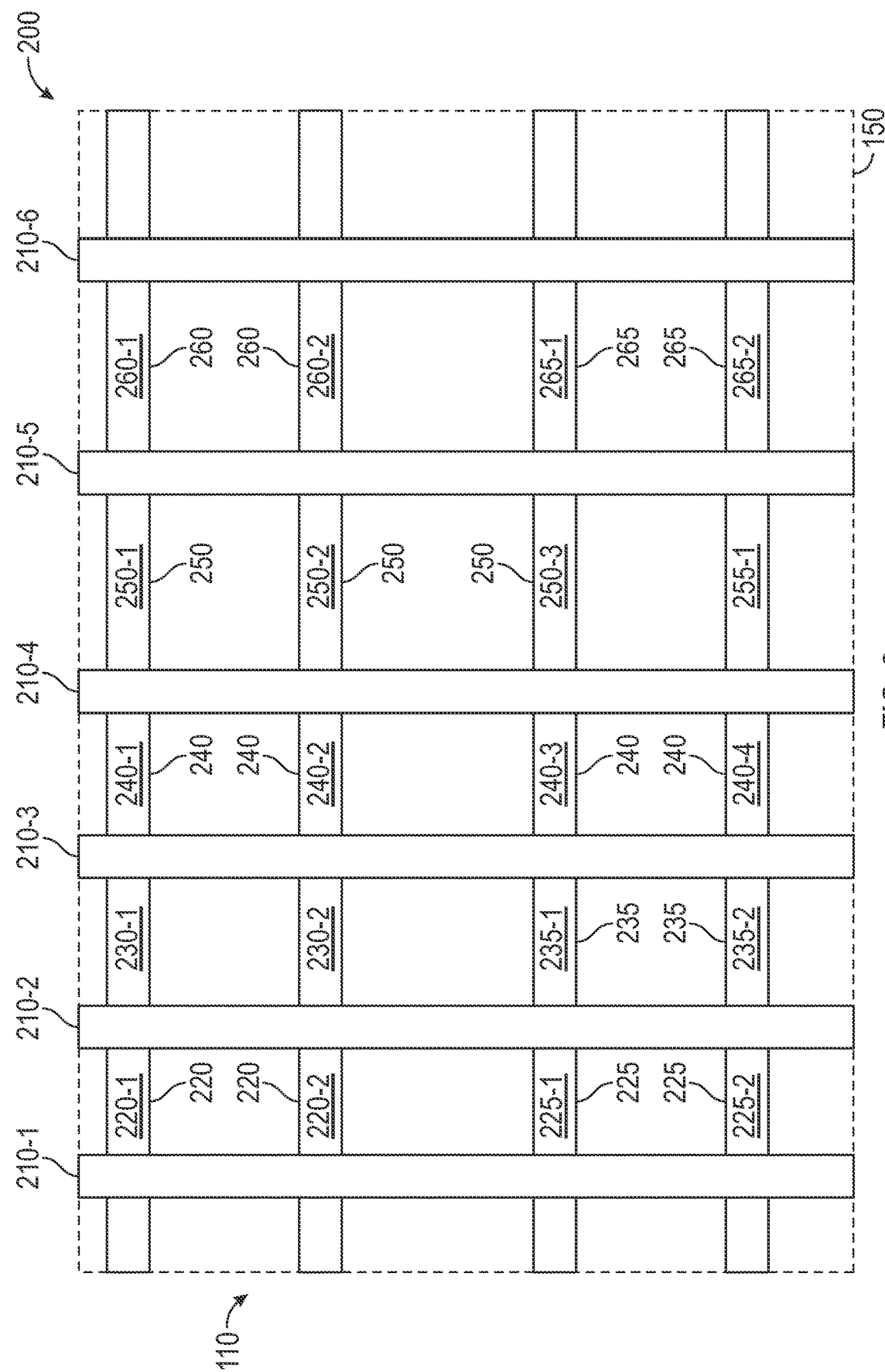
FIG. 2 is a sectional illustration of composite members in a composite structure system, according to one embodiment.

FIG. 2 is a sectional illustration 200 of composite members in a composite structure system, according to one embodiment. The section 150 of airframe 110 is shown in FIG. 2 without a skin member, such as the skin member 140 in FIG. 1. The section 150 includes frame components 210-1-210-6 which provide structural support to the airframe 110 and support for the skin member as described in relation to FIG. 1.

In order to provide additional structural support, the airframe 110 includes stringer components (herein stringers) positioned between the various frame components. The stringers include stringers 220-1-220-2, 225-1-225-2, 230-1-230-2, 235-1-235-2, 240-1-240-4, 250-1-250-3, 255-1, 260-1-260-2, and 265-1-265-2. In some examples, due to the varying shape and structure of the airframe 110, the stringers have varying dimensions and shapes. These varying dimensions include varying ply/book numbers (thickness), lengths, internal cross-sections, curvature, etc. as described in more detail herein. However, the various stringers may include similar dimensions such that the stringers may be grouped into subsets of composite members. For example, the stringers 220-1 and 220-2 are in a subset 220. Stringers 225-1 and 225-2 are part of subset 225, stringers 235-1 and 235-2 are in subset 235, stringers 240-1-240-4 are in a subset 240, stringers 250-1-250-3 are in a subset 250, stringers 260-1 and 260-2 are in a subset 260, and stringers 265-1 and 265-2 are in a subset 265.

In some examples, the stingers in a same subset, such as the stringer 220-1 and the stringer 220-2 may have different shapes or other dimensions, but are the outer shapes are similar enough to utilize a same repair component as described in more detail herein. Varying shapes and dimensions are shown in more detail in relation to FIGS. 3A and 3B.

Figure 3A:
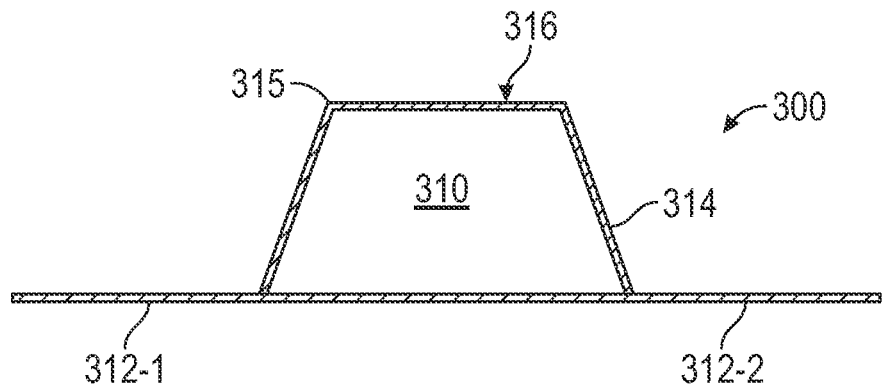
FIGS. 3A-3C illustrate composite members with varying geometries, according to embodiments described herein.
Figure 3B:
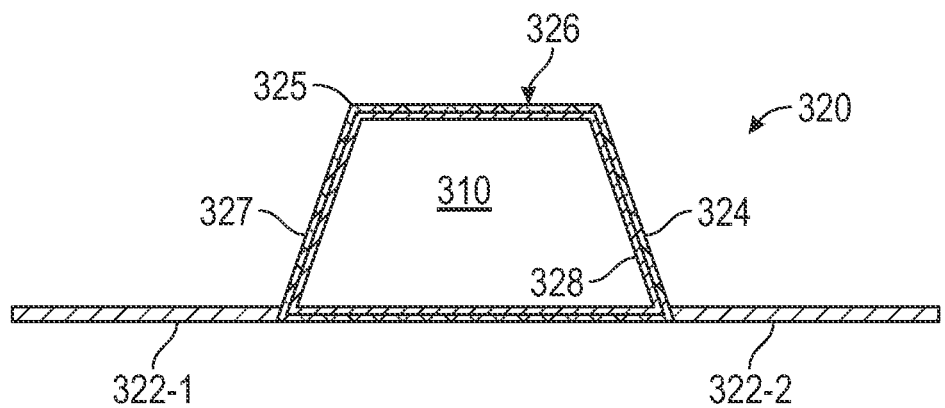
Figure 3C:
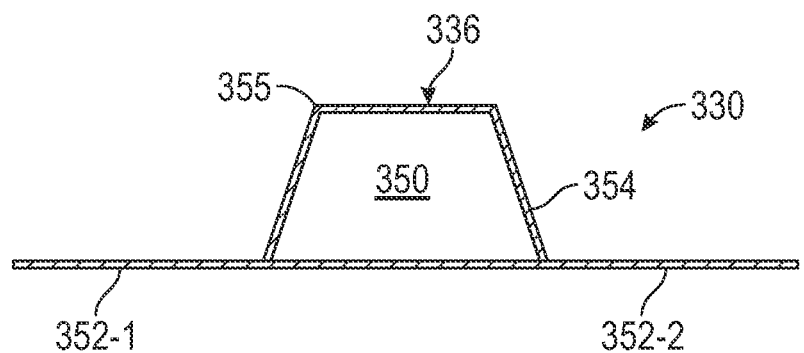

FIGS. 3A-3C illustrate composite members with varying geometries, according to embodiments described herein. For example, FIG. 3A illustrates a cross-section view of a stringer 300 which may be any of the stringers described in relation to FIG. 2 in the aircraft 100. The stringer 300 includes flanges 312-1 and 312-2 positioned on either side of hat-stiffened structure 315. In some examples, the hat-stiffened structure 315 is a hollow structure with an internal space 310 and an outer geometry 316 on the surface 314 of the hat-stiffened structure 315. The size of the hat-stiffened structure 315 and the internal space 310 is specified in an overall design of the airframe 110 and the geometry of the hat-stiffened structure 315 and the internal space 310 provides the necessary structural support required by the stringer 300. In some examples, the internal space 310 is consistent across many stringers, but the outer geometry, such as the outer geometry 316 may change across the stringers.

For example, FIG. 3B illustrates a cross-section view of a stringer 320. The stringer 320 includes flanges 322-1 and 322-2 positioned on either side of hat-stiffened structure 325. The hat-stiffened structure 315 is a hollow structure with the internal space 310. In this example, the stringer 320 is a composite stack with multiple books of composite material, where each book may contain two plies of composite material. The hat-stiffened structure 325 includes book 327 and book 328 which results in an outer geometry 326 of the hat-stiffened structure 325 on the surface 324. The outer geometry 326 is different from the outer geometry 316 of the hat-stiffened structure 315 even though both the hat-stiffened structure 315 and the hat-stiffened structure 325 share a same internal space such as the internal space 310. As discussed above, these varying outer geometries results in varying needs for repair components among even similar composite members (e.g., the stringers 300 and 320). Additionally, geometries to a larger degree than the variation between the stringers 300 and 320.

For example, FIG. 3C illustrates a cross-section view of a stringer 330. The stringer 330 includes flanges 352-1 and 352-2 positioned on either side of hat-stiffened structure 355. The hat-stiffened structure 355 is a hollow structure with the internal space 350 and an outer geometry 336 on the surface 354. In this example, the internal space 350 is smaller than the internal space 310 of the stringers 300 and 320, which results the outer geometry 336 being smaller than both the outer geometry 316 and 326 the outer geometry. These varying outer geometries are further altered by the various installation points in the airframe 110. For example, a stringer with a same cross-section geometry as the stringer 330 at a given point may be curved or have varying geometries along a length of the stringer. While shown in FIGS. 3A-3C as 3 cases of varying geometries, the multiple and varied geometries of composite members across a composite structure system results in the large and varied number of locations with unique geometries which require unique repair solutions as described in relation to FIGS. 4A-8C.

Figure 4A:
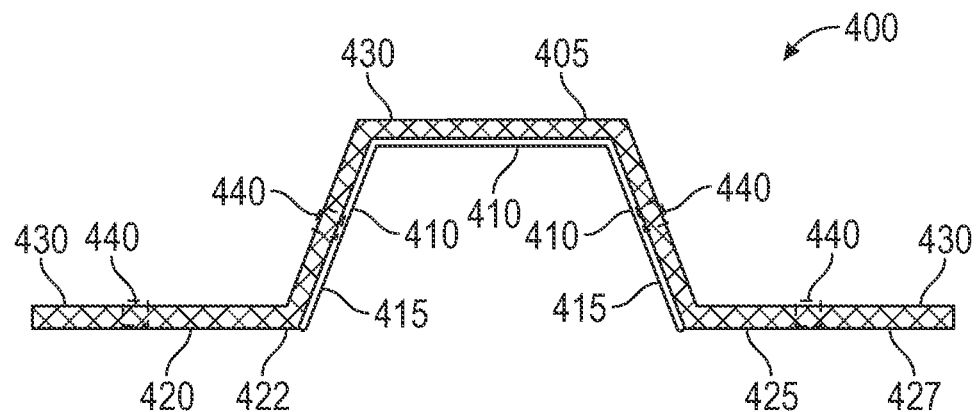
FIGS. 4A and 4B illustrate a repair component for a composite member, according to embodiments described herein.
Figure 4B:
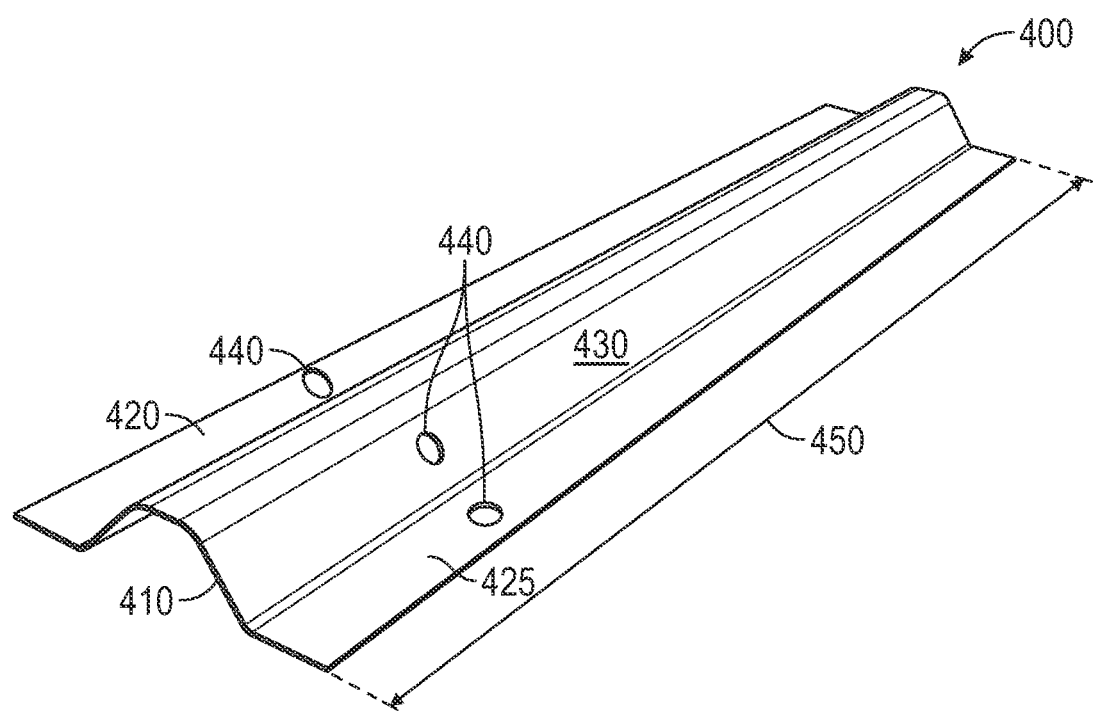

FIGS. 4A and 4B illustrate a repair component for a composite member, according to embodiments described herein. FIG. 4A is a cross-sectional view of a repair component 400 and FIG. 4B is a perspective view of the repair component 400. The repair component 400 may be formed from composite materials and includes a first flange section 420 and a second flange section 425. The repair component 400 also includes a repair section 405 between the first flange section 420 and the second flange section 425. The repair section 405 includes an internal cross-sectional profile 410 defined on a repair surface 415 the repair section 405. In some examples, the repair section 405 is positioned over a damaged section of a composite member, such as the stringers described in relation to FIGS. 3A-3C, where the repair surface 415 faces an external surface of the composite member and the internal cross-sectional profile 410 matches the external cross-sectional profile within a given tolerance. An installed repair component is described in more detail in relation to FIGS. 6-8C. In some examples, the external cross-sectional profile defined on the external surface of the composite member is a hat-stiffened structural profile as shown in FIGS. 3A-3C, such that the internal cross-sectional profile 410 is also a hat stiffened structural profile.

In some examples, the repair component 400 also includes a plurality of bolt holes for attaching the repair component to a composite member. For example, the repair component 400 includes a first surface 430 on the first flange section 420, the second flange section 425, and the repair section 405. The first flange section 420 includes a second surface 422 opposite the first surface 430, the second flange section 425 includes a third surface 427 opposite the first surface 430. Bolt holes 440 are formed through the repair component 400 from the first surface 430 to the surfaces of the respective sections, including to one of the repair surface 415, the second surface 422, and the third surface 427. In some examples, the bolt holes 440 may be formed during the fabrication process creating the repair component 400 or may be formed during a repair of a damaged section of a composite member. In some examples, the repair component is attached to the composite member via a plurality of fastened bolts, where each fastened bolt of the plurality of fastened bolts is positioned in a respective bolt hole of the bolt holes 440.

In some examples, the repair component includes a fabrication length 450 which may be a standard length (e.g., 76 inches, etc.), The repair component 400 is cut down to a selectable length shorter than the fabrication length 450, prior to attachment to the composite member as described in more detail in relation to FIGS. 6-8C. As described above, composite members in a composite structure system may include a variety of shapes and geometries such as an individual generic repair component may not fit over a composite member for repair. Thus an assortment of repair components in a repair system is needed provide for repairing a composite structure system.

Figure 5A:
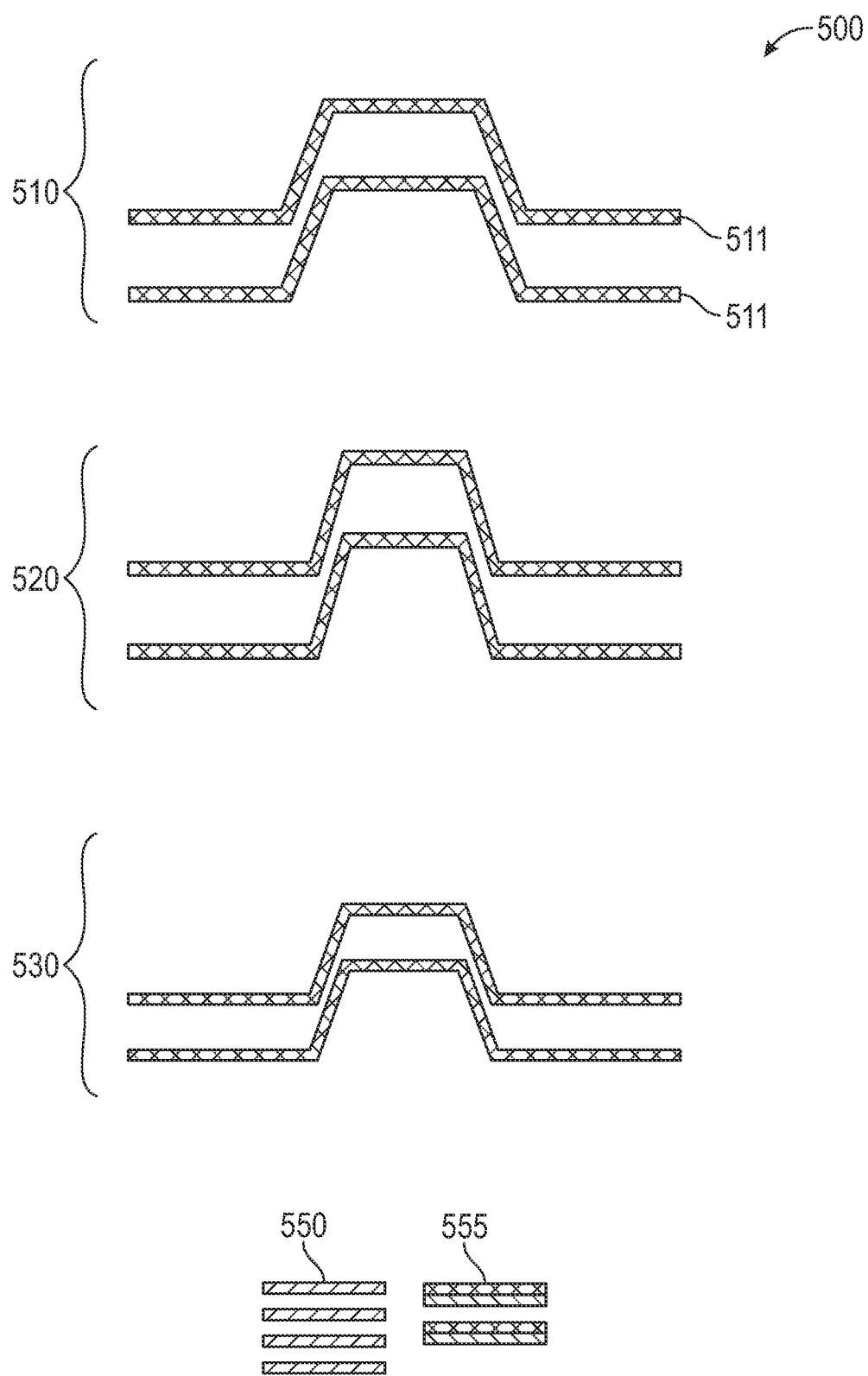
FIGS. 5A and 5B illustrate a repair system for a composite structure system, according to one embodiment.
Figure 5B:
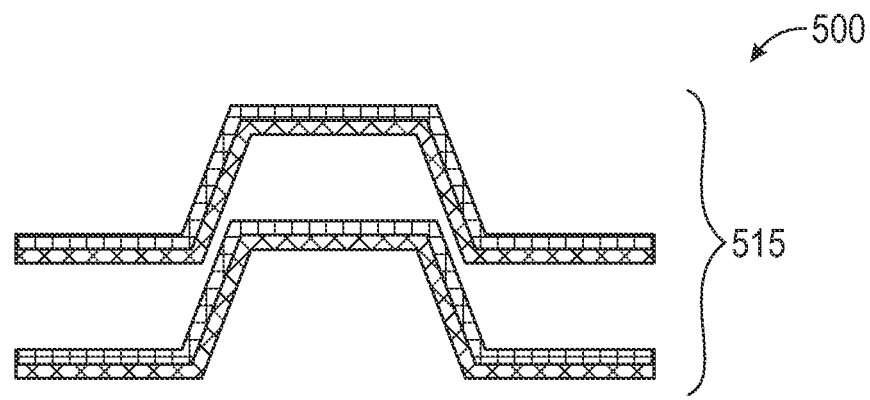
Figure 5B:
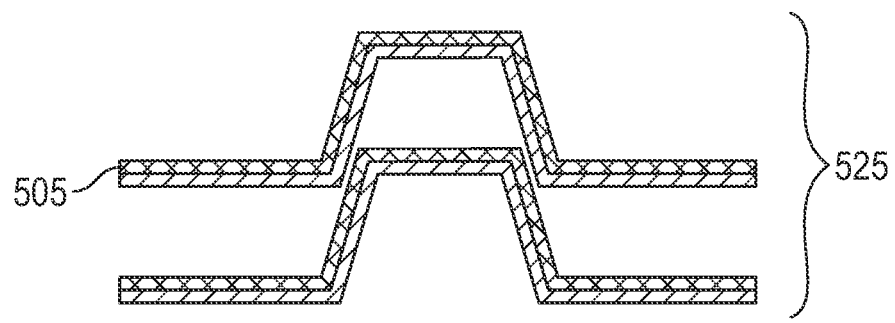
Figure 5B:
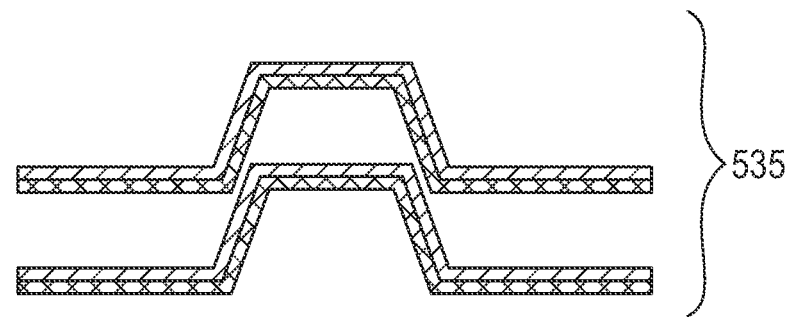

FIGS. 5A and 5B illustrate a repair system 500 for a composite structure system, according to one embodiment. The repair system 500 includes a total set 505 of repair components, include repair component similar to the repair component 400 in FIG. 4. The total set 505 includes a plurality of repair component subsets. For example, the total set 505 includes subsets 510, 515, 520, 525, 530, and 535. In some examples, each repair component in respective repair component subset includes features for repairing a subset of composite members in the composite structure system. The total set 505 may include enough varying subsets of repair components to provide prefabricated repair components for a large number composite members for a composite structure system, such as the aircraft 100. The total set 505 and the repair system 500 provide a number of interchangeable repair components that is far less than a number of unique composite members and may be utilized in a shorter amount of time than fabricating a unique repair component for a damaged composite member.

For example, the subset 510 may be used to repair the subset 220 and the subset 265 described in relation to FIG. 2. For example, the sizing of each repair component 511 of the subset 510 includes sizing dimensions suitable to repair the subset of composite members in the subset 220 and 265. Each repair component 511 of the subset 510 includes the various features for repairing a subset of composite members. The features may include at least a first flange section, a second flange section; and a repair section as described in relation to FIGS. 4A and 4B. The various subsets of repair components may include differing geometries and shapes. For example, the subsets 510, 520, and 530 have differing internal cross-sectional profiles. Additionally, the subsets 515, 525, and 535 are formed from multiple books of composite material to provide a varying levels shapes and structural support requirements for the composite structure.

In some examples, the components in a subset of repair components may not have a precise geometrical match to a subset of composite members. For example, the repair component 511 may be used to match the geometries of the stringer 220-1 in subset 220 without any spacing between the surfaces of the composite member and the repair component. In another example, the repair component 511 positioned over the stringer 265-1 may fit relatively well, but include space or gaps (i.e. air gaps) between the repair component and the composite member. In some examples, the repair system 500 includes a set of prefabricated shims including shims 550 and 555. The set of prefabricated shims are configured to fill an air gap and may be used to fill any gaps between a repair component and the composite member, as described in more detail in relation to FIGS. 6-8C.

Figure 6:
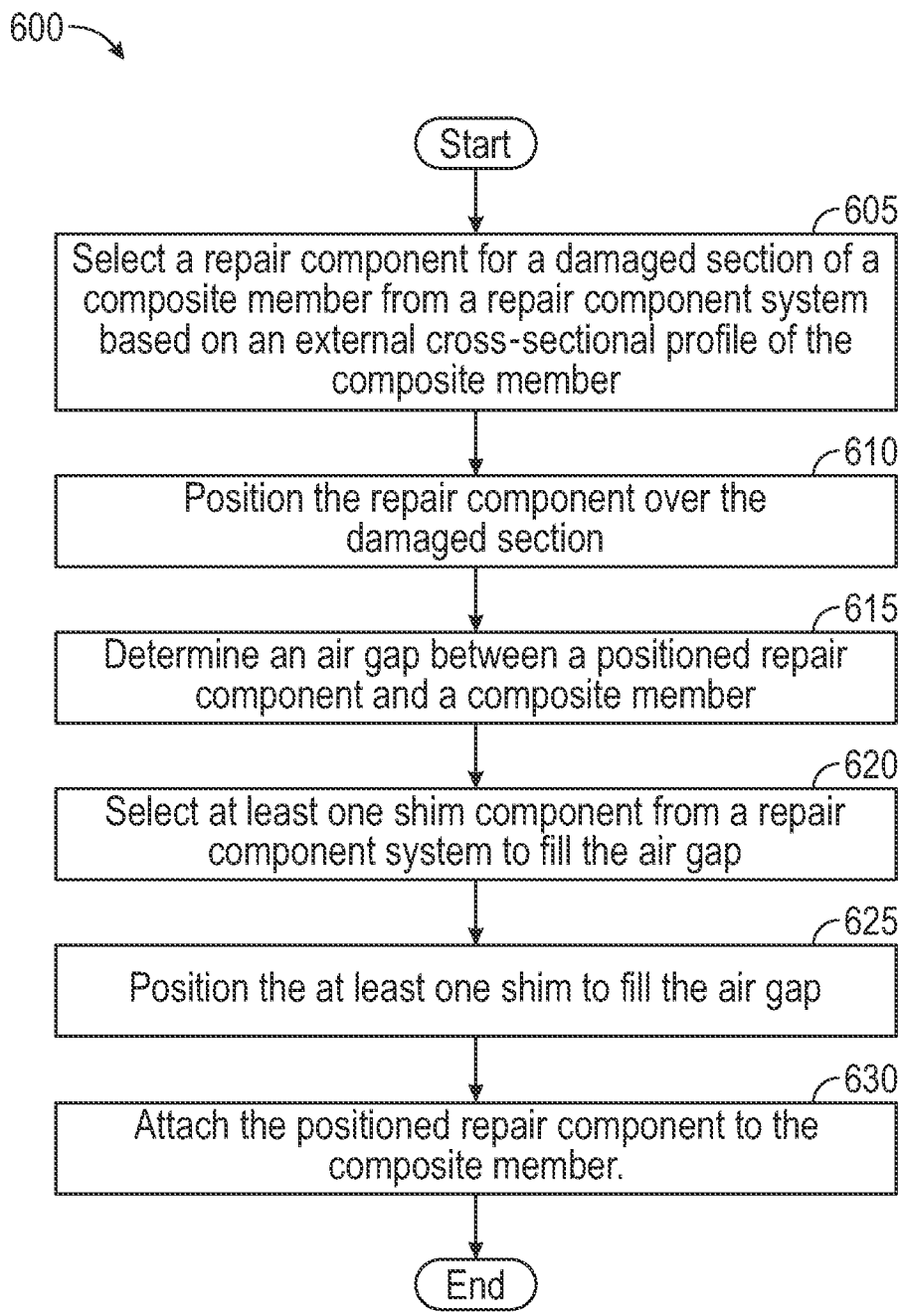
FIG. 6 is a flowchart for a method to repair a composite member using a repair system, according to one embodiment.

FIG. 6 is a flowchart for a method 600 to repair a composite member using a repair system, according to one embodiment. FIGS. 7A-7B and 8A-8C illustrate steps in a method to repair a composite member using a repair system, according to one embodiment. For ease of discussion, reference will be made to FIGS. 7A-7B and 8A-8C during the discussion of the method 600.

Figure 7A:
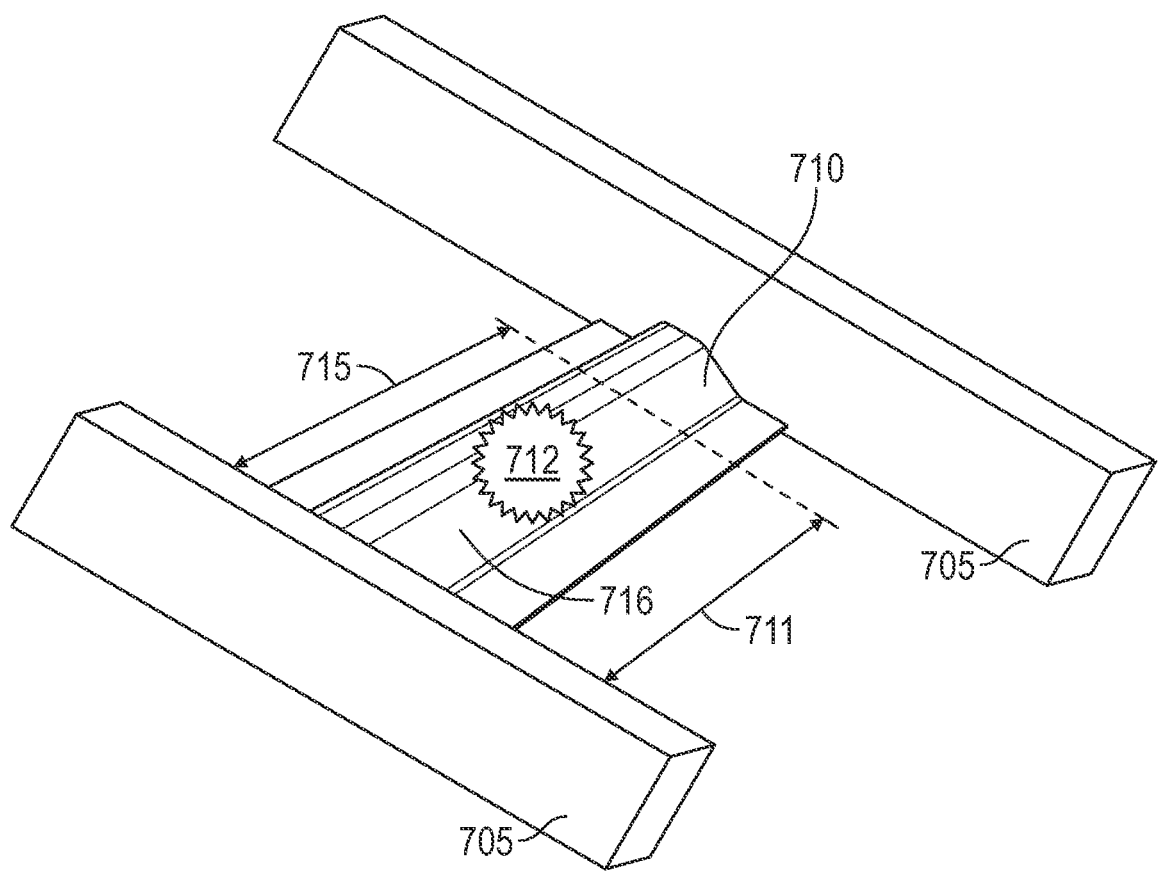
FIGS. 7A-7B illustrate steps in a method to repair a composite member using a repair system, according to one embodiment.
Figure 7B:
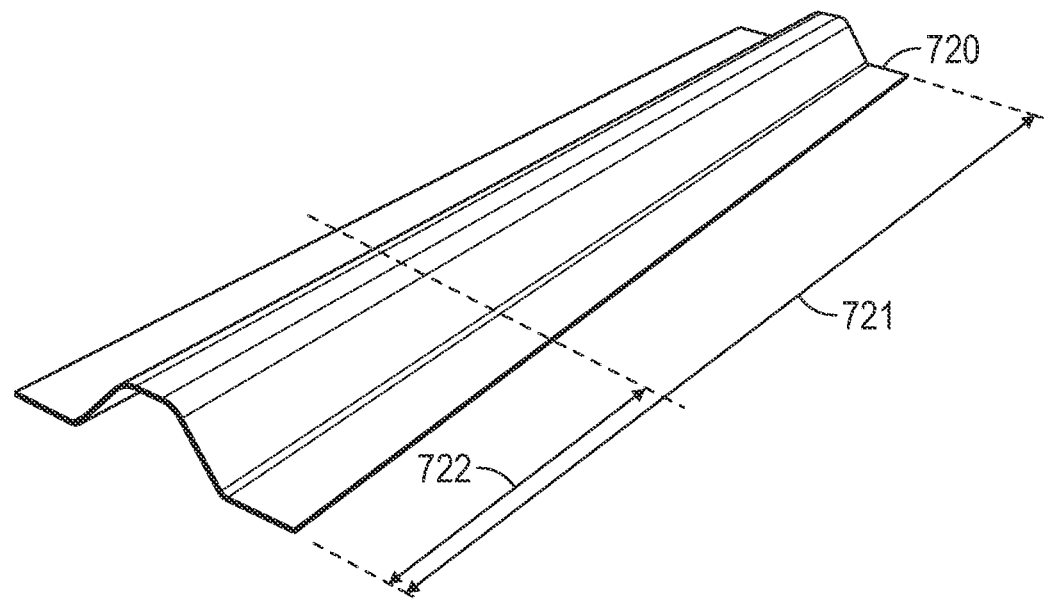

Method 600 begins at block 605 and includes selecting a repair component for a damaged section of a composite member from a repair component system based on an external cross-sectional profile of the composite member. For example, as shown in FIG. 7A, a composite member 710 is installed in a composite structure system, such as the aircraft 100, between frame components 705. The composite member 710 has suffered some damage 712 in a damaged section 711. In some examples, the damaged section 711 is less than the whole of the composite member 710 and has a length of 715. In another example, an entire length of the composite member may be in the damaged section 711 and require a repair component.

The damaged section 711 has an external cross-sectional profile 716 which may include any of the profiles of the stringers discussed in relation to FIGS. 3A-3C. Selecting the repair component is based on the external cross-sectional profile 716 and includes selecting a repair component 720 shown in FIG. 7B from a repair system, such as the repair system 500 a corresponding repair component for repairing the damaged section 711. In some examples, the corresponding component may be defined in a component map for the composite structure system and the repair system 500. In some examples, method 600 includes determining a selectable length 722 for the repair section based on a lateral length of the damaged section of the composite member such as the length 715 and cutting the selected repair component from a fabrication length 721 to the selectable length 722.

Figure 8A:
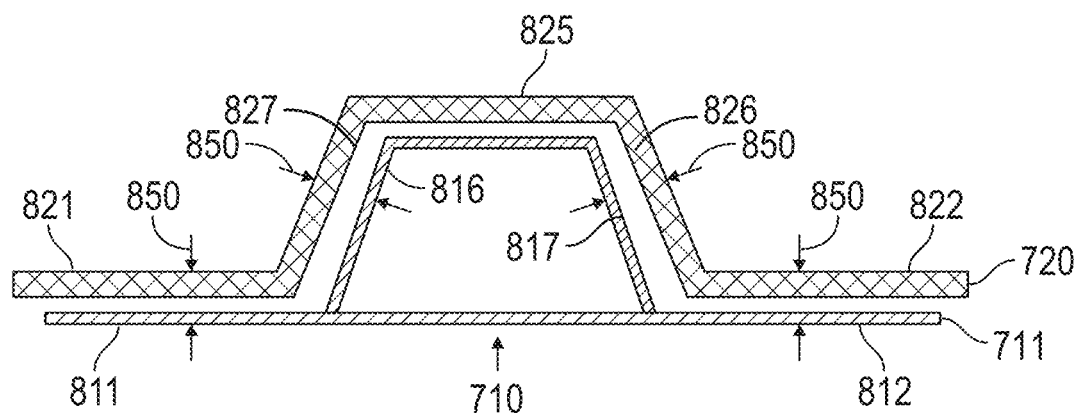
FIGS. 8A-8C illustrate steps in a method to repair a composite member using a repair system, according to one embodiment.
Figure 8B:
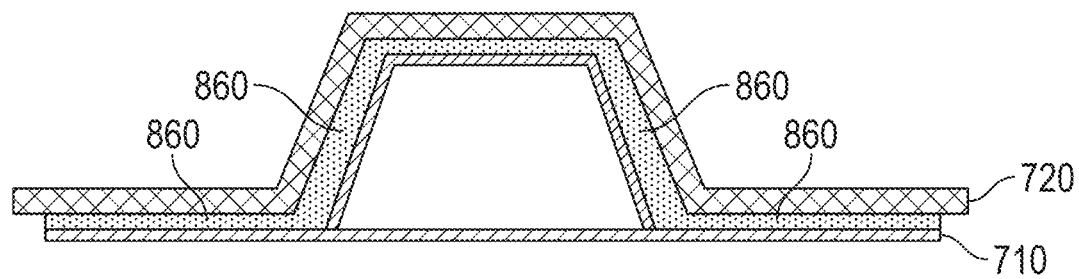
Figure 8C:
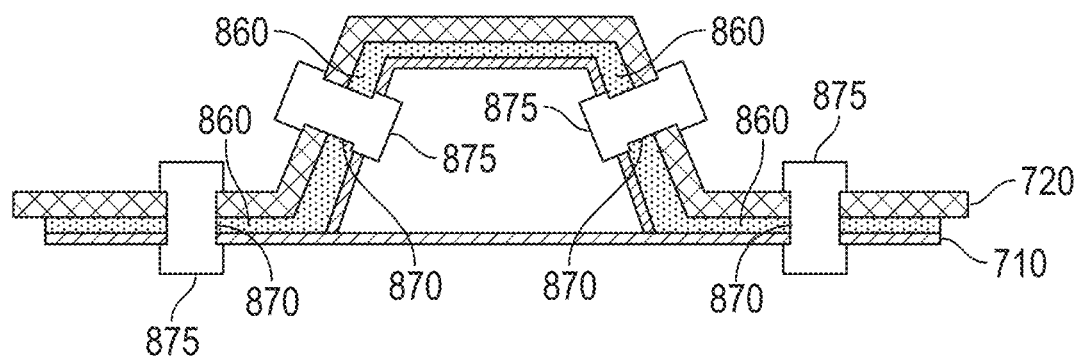

Method 600 continues at block 610 and includes positioning the repair component over the damaged section such that a first flange section of the repair component is positioned on a first side of the composite member, a second flange section of the repair component is positioned over a second side of the composite member, and a repair section of the repair component, between the first flange section and the section flange section, is positioned over at least the damaged section of the composite member as shown in FIGS. 8A-8C.

For example, as shown in FIG. 8A, the repair component 720 is positioned over the damaged section 711 of the composite member 710 such that a first flange section 821 of the repair component 720 is positioned over a first side 811 of the composite member, a second flange section 822 of the repair component 720 is positioned over a second side 812 of the composite member 710, and a repair section 825 between the first flange section 821 and the section flange section 822 of repair component 720 is positioned over at least the damaged section 711 of the composite member 710.

In some examples, the repair section 825 includes an internal cross-sectional profile 826 defined on a repair surface 827 of repair section 825, where the repair surface 827 faces an external surface 817 of the composite member 710, In some examples, the composite member 710 includes an external hat-stiffened structural profile defined on the external surface 817, and the internal cross-sectional profile 826 matches the external hat-stiffened structural profile 816 within a given tolerance. In some examples, the mismatch between the geometries of the two sections creates air gaps 850 between the repair component 720 and the composite member 710. In an example where the air gaps are larger than the tolerance level, [the] shims 860 may be used to provide necessary support and decrease or eliminate the air gaps. For example at block 615 and 620 method 600 includes determining an air gap between a positioned repair component and a composite member and selecting at least one shim component from a repair component system to fill the air gap. For example, a thickness of the air gap may be measured in order to determine a thickness of shims 860 need to fill the air gap. Method 600 also includes, at block 625, positioning one or more shims 860 into the air gaps 850 between the repair component 720 and the external surface 817 of the composite member to provide additional structural support as shown in FIG. 8B. In some examples, the shims 860 comprise a group of individual shims, such as without limitation shims 550 and 555 nested on top of each other in order to fill the air gap 850 (i.e. fill the determined thickness of the air gap as determined at block 615).

At block 630, method 600 includes attaching the positioned repair component to the composite member. For example, as shown in FIG. 8C, the repair component 720 is attached to the composite member 710 using bolts 875 positioned through various bolt holes 870 formed in through the composite member 710 and the repair component 720, and the shims 860 as described in relation to FIGS. 4A and 4B. In some examples, attaching the positioned repair component includes: positioning a plurality of bolts through the plurality of bolt holes such that the bolts pass through the repair component and the composite member and fastening the plurality of positioned bolts to secure the repair component to the composite member.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A repair set configured to repair a number of composite members, wherein the repair set comprises:
   a number of repair components that is less than the number of composite members, wherein each repair component in the number of repair components:
      is not shaped as a geometrical match to any composite member in the number of composite members; and
      is shaped to overlay and repair more than one composite member in the number of composite members and comprises:
         a repair section configured for placement adjacent to a damaged section of a composite member in the number of composite members; and
         sections adjacent on both sides of the repair section, wherein each section of the sections comprises, respectively, a bolt hole; and
   a set of shims prefabricated in shapes configured to supplement the number of repair components and fill:
      a first air gap between the repair section and a damage of the composite member; and
      a second air gap between an adjacent section of the sections and an undamaged surface of the composite member; and
   wherein the composite member comprises a stringer component in an aircraft.

2. The repair set of claim 1,
   wherein the sections comprise a first surface on a first flange section, a second flange section, and the repair section,
   wherein the first flange section comprises a second surface opposite the first surface,
   wherein the second flange section comprises a third surface opposite the first surface, and
   wherein at least one shim in the set of shims comprises a second bolt hole configured to align with the bolt hole in the adjacent section; and
   wherein a repair component in the number of repair components is attached to the composite member via a plurality of fastened bolts, wherein each fastened bolt of the plurality of fastened bolts is positioned in the respective bolt hole.

3. The repair set of claim 1, wherein each repair component comprises a composite material.

4. The repair set of claim 1, wherein a repair component in the number of repair components comprises a fabrication length, wherein the repair component is cut down to a selectable length shorter than the fabrication length prior to attachment to the composite member.

5. The repair set of claim 1, wherein:
   the shims in the set of shims are prefabricated as dual-ply; and
   a repair surface of the repair section faces an external surface of the composite member, wherein the first air gap is between the repair surface and the external surface.

6. The repair set of claim 5, wherein an external cross-sectional profile defined on the external surface of the composite member comprises a hat-stiffened structural profile.

7. A repair system for a composite structure system, wherein the repair system comprises:
   a total set of repair components that comprise a plurality of repair component subsets that each comprise a number of repair components less than a number of composite members in a subset of composite members of the composite structure system, wherein each repair component in a repair component subset:
      is not shaped as a geometrical match to any composite member in the number of composite members; and
      is shaped to overlay and repair more than one composite member in the subset of composite members and comprises:
         a repair section formed for placement adjacent to a damaged section of a composite member in the subset of composite members in the composite structure system; and
         sections adjacent on both sides of the repair section, wherein each section of the sections comprises, respectively, a bolt hole;
   a set of dual-ply prefabricated shims sized as complements compliments to the repair component subset and to fill:
      a first air gap between a damaged section of a composite member in the subset of composite members and the repair section; and
      a second air gap between an adjacent section of the sections and an undamaged surface of the composite member
   wherein the composite structure system comprises an aircraft, wherein the subset of composite structures comprises a plurality of stringer components in the aircraft, and wherein the damaged section of the composite member is a section of a stringer in the aircraft.

8. The repair system of claim 7, wherein each repair component and each of the at least one shim comprises a composite material.

9. The repair system of claim 7, wherein each repair component comprises a fabrication length, wherein a respective repair component is cut down to a selectable length shorter than the fabrication length, prior to attachment to the damaged section of the composite member.

10. The repair system of claim 7, wherein each repair component subset of the plurality of repair component subsets comprises at least one repair component that comprises sizing dimensions suitable to repair the subset of composite members, and where each repair component of a repair component subset comprises:
- a first flange section;
- a second flange section; and
- a repair section between the first flange section and the second flange section that comprises an internal cross-sectional profile defined on a repair surface of repair section, where the repair section is positioned over at least a damaged section of a composite member of the subset of composite members, where the repair surface faces an external surface of the composite member, wherein the first air gap is between the repair surface and the external surface, where the composite member comprises an external cross-sectional profile defined on the external surface, and where the internal cross-sectional profile matches the external cross-sectional profile within a given tolerance.

11. The repair system of claim 10, wherein the external cross-sectional profile comprises a hat-stiffened structural profile.

12. The repair system of claim 10, wherein each repair component comprises a first surface on the first flange section, the second flange section, and the repair section,
- wherein the first flange section comprises a second surface opposite the first surface,
- wherein the second flange section comprises a third surface opposite the first surface, and
- wherein a repair component in the repair component subset further comprises a plurality of bolt holes, wherein each bolt hole of the plurality of bolt holes is formed through the repair component from the first surface to one of the repair surface or the second surface; and
- wherein the repair component is attached to a damaged composite member via a plurality of fastened bolts, wherein each fastened bolt of the plurality of fastened bolts is positioned in a respective bolt hole of the plurality of bolt holes.

13. A method for repairing a composite member, the method comprising:
- determining an air gap between a positioned repair component and a composite member;
- selecting at least one prefabricated dual-ply shim component from a repair component system comprising:
  - a total set of repair components comprising a plurality of repair component subsets each comprising a number of repair components less than a number of composite members in a subset of composite members comprising the composite member, wherein each repair component in a repair component subset:
    - is not shaped as a geometrical match to any composite member in the subset of composite members; and
    - is shaped to overlay and repair more than only the composite member in the subset of composite members and comprises:
      - a repair section formed for placement adjacent to a damaged section of the composite member; and
      - sections adjacent on both sides of the repair section, wherein each section of the sections comprises, respectively, a bolt hole;
  - a set of shims prefabricated in dual-ply and configured to fill:
    - the air gap between a damaged section of a composite member in the subset of composite members and the repair section; and
    - a second air gap between an adjacent section of the sections and an undamaged surface of the composite member;
- positioning the at least one prefabricated dual-ply shim to fill the air gap; and
- attaching the positioned repair component and the at least one prefabricated dual-ply shim to the composite member; and
- wherein the composite member comprises a stringer component in an aircraft.

14. The method of claim 13, further comprising:
- selecting a repair component for a damaged section of the composite member from the repair component system based on an external cross-sectional profile of the composite member; and
- positioning the repair component over the damaged section such that a first flange section of the repair component is positioned on a first side of the composite member, a second flange section of the repair component is positioned over a second side of the composite member, and a repair section of the repair component, between the first flange section and the second flange section, is positioned over at least the damaged section of the composite member.

15. The method of claim 14, further comprising:
- determining a selectable length for the repair section based on a lateral length of the damaged section of the composite member; and
- cutting the repair component from a fabrication length to the selectable length.

16. The method of claim 14, wherein the repair section comprises an internal cross-sectional profile defined on a repair surface of a repair section, wherein the repair surface faces an external surface of the composite member, wherein the composite member comprises an external hat-stiffened structural profile defined on the external surface, and where the internal cross-sectional profile matches the external hat-stiffened structural profile within a given tolerance.

17. The method of claim 16,
- wherein the repair component comprises a first surface on the first flange section, the second flange section, and the repair section,
- wherein the first flange section comprises a second surface opposite the first surface, wherein the second flange section comprises a third surface opposite the first surface, and wherein the repair component further comprises a plurality of bolt holes, wherein each bolt hole of the plurality of bolt holes is formed through the repair component from the first surface to one of the repair surface, the second surface, and the third surface; and
- wherein attaching the positioned repair component to the composite member comprises:
- positioning a plurality of bolts through the plurality of bolt holes such that the bolts pass through the repair component and the composite member; and fastening the plurality of bolts to secure the repair component to the composite member.

\* \* \* \* \*

UNITED STATES PATENT AND TRADEMARK OFFICE
CERTIFICATE OF CORRECTION

PATENT NO. : 12,420,954 B2
APPLICATION NO. : 18/299421
DATED : September 23, 2025
INVENTOR(S) : Remmelt A. Staal, Arne K. Lewis and Justin H. Register Page 1 of 1

It is certified that error appears in the above-identified patent and that said Letters Patent is hereby corrected as shown below:

In the Claims

Column 12, Lines 51-52, Claim 7 correct "complements compliments" to read -- complements --.

Signed and Sealed this
Fourth Day of November, 2025

John A. Squires
*Director of the United States Patent and Trademark Office*